US012647934B1

(12) United States Patent
Vatidis et al.

(10) Patent No.: US 12,647,934 B1
(45) Date of Patent: Jun. 2, 2026

(54) TIME BASED INDOOR LOCATION DETERMINATION

(71) Applicant: Hubstar International Limited, London (GB)

(72) Inventors: Stefanos Vatidis, London (GB); Denis Mequinion, London (GB)

(73) Assignee: Hubstar International Limited, London (GB)

( * ) Notice: Subject to any disclaimer, the term of this patent is extended or adjusted under 35 U.S.C. 154(b) by 0 days.

(21) Appl. No.: 19/293,738

(22) Filed: Aug. 7, 2025

(51) Int. Cl.
*H04W 64/00* (2009.01)

(52) U.S. Cl.
CPC ................................. *H04W 64/00* (2013.01)

(58) Field of Classification Search
CPC ................................................... H04W 64/00
See application file for complete search history.

(56) References Cited

U.S. PATENT DOCUMENTS

| | | | | |
|---|---|---|---|---|
| 9,244,152 | B1 * | 1/2016 | Thiagarajan | .......... G01S 5/0264 |
| 9,826,349 | B1 * | 11/2017 | Yang | ..................... H04W 4/029 |
| 10,003,925 | B1 * | 6/2018 | Zhao | ..................... H04W 4/029 |
| 10,051,600 | B1 * | 8/2018 | Zhong | ..................... H04L 67/12 |
| 10,600,013 | B2 | 3/2020 | Köppel et al. | |
| 11,080,634 | B2 | 8/2021 | Köppel et al. | |
| 11,317,371 | B1 * | 4/2022 | Vatidis | .................. H04W 4/029 |
| 11,386,372 | B2 | 7/2022 | Köppel et al. | |
| 12,387,606 | B2 * | 8/2025 | Chen | ..................... G06Q 50/40 |
| 2010/0250727 | A1 * | 9/2010 | King | ..................... G01S 5/0027 |
| | | | | 709/224 |

| | | | | |
|---|---|---|---|---|
| 2011/0307428 | A1 * | 12/2011 | Wirola | .................. H04W 4/029 |
| | | | | 706/12 |
| 2012/0058782 | A1 * | 3/2012 | Li | ......................... H04W 4/029 |
| | | | | 455/456.2 |
| 2015/0176998 | A1 * | 6/2015 | Huang | .................. H04W 4/021 |
| | | | | 701/400 |
| 2015/0181405 | A1 * | 6/2015 | Dua | ...................... H04W 8/005 |
| | | | | 455/456.3 |
| 2015/0248436 | A1 * | 9/2015 | Podemsky | .............. H04L 67/54 |
| | | | | 707/724 |
| 2016/0345163 | A1 * | 11/2016 | Monaghan | ............ H04W 4/029 |
| 2019/0320292 | A1 * | 10/2019 | Knebl | .................. H04W 4/029 |

(Continued)

FOREIGN PATENT DOCUMENTS

| | | |
|---|---|---|
| EP | 3226182 A1 | 10/2017 |
| EP | 3437033 A1 | 2/2019 |

*Primary Examiner* — Steven S Kelley
(74) *Attorney, Agent, or Firm* — Dority & Manning, P.A.

(57) ABSTRACT

A computer system obtaining location data derived from a plurality of data sources, the location data is associated with a user. The location data comprises one or more data points, each of which comprises a location indication, time data associated with the location indication, an indication of the data source from which the location indication was derived, and a confidence score associated with the location indication. The computer system produces a location estimate for the user in relation to an area at a given time point by: for each of at least some of the data sources, obtaining one of the data points from amongst the data points associated with the respective data source, the obtained data point having time data that corresponds to the given time point; and providing the location estimate based on the location indications, confidence scores and time data associated with the obtained data points.

15 Claims, 10 Drawing Sheets

(56) References Cited

U.S. PATENT DOCUMENTS

| 2024/0214772 | A1* | 6/2024 | Mizes | ................... | H04W 4/027 |
| 2025/0089016 | A1* | 3/2025 | Belzberg | ............. | H04W 64/006 |
| 2025/0294509 | A1* | 9/2025 | Fox | ....................... | H04W 4/021 |

* cited by examiner

| Description | PersonID | Region | Building | Floor | Section | Room | Workstation | Timestamp | Confidence | AttritionRule | Origin |
|---|---|---|---|---|---|---|---|---|---|---|---|
| GPS report | AAAA | Canary Wharf, London, UK | | | | | | 12/04/2024 07:45 | 100% | TimeSinceLastReport(5Min) | GPS |
| Badge swipe building entrance | AAAA | Canary Wharf, London, UK | Building A | | | | | 12/04/2024 07:55 | 100% | WorkingHoursTimeSinceLastReport(5Min) | Badge Swipe |
| Wifi (ground floor) | AAAA | Canary Wharf, London, UK | Building A | 0 | | | | 12/04/2024 08:05 | 75% | TimeSinceLastReport(5Min) | WiFi |
| Has booking (not checked in) | AAAA | Canary Wharf, London, UK | Building A | 4 | | Open Plan 1 | Desk 55 | 12/04/2024 08:00 | 10% | Until(12/04/2024 17:30) | Booking |
| Wifi (4th floor) | AAAA | Canary Wharf, London, UK | Building A | 4 | | | | 12/04/2024 08:05 | 75% | TimeSinceLastReport(5Min) | WiFi |
| Connected Laptop at workstation | AAAA | Canary Wharf, London, UK | Building A | 4 | | Open Plan 1 | Desk 55 | 12/04/2024 08:08 | 100% | None | LAN connection |
| Unchecked in Booking for Meeting room | AAAA | Canary Wharf, London, UK | Building A | 8 | | Meeting Room 5 | | 12/04/2024 13:00 | 10% | Until(12/04/2024 14:00) | Booking |
| Wifi (8th floor) | AAAA | Canary Wharf, London, UK | Building A | 8 | | | | 12/04/2024 13:03 | 75% | TimeSinceLastReport(5Min) | WiFi |
| Checked in Booking for meeting room | AAAA | Canary Wharf, London, UK | Building A | 8 | | Meeting Room 5 | | 12/04/2024 13:05 | 90% | Until(12/04/2024 14:00) | Booking |
| Presence detected | | Canary Wharf, London, UK | Building A | 8 | | Meeting Room 5 | | 12/04/2024 13:07 | 100% | None | Sensor |
| No Presence detected | | Canary Wharf, London, UK | Building A | 8 | | Meeting Room 5 | | 12/04/2024 13:58 | 100% | None | Sensor |
| Checked out booking | AAAA | Canary Wharf, London, UK | Building A | 8 | | Meeting Room 5 | | 12/04/2024 13:50 | 100% | Until(12/04/2024 13:50) | Booking |
| Wifi (4th floor) | AAAA | Canary Wharf, London, UK | Building A | 4 | | | | 12/04/2024 14:04 | 75% | TimeSinceLastReport(5Min) | WiFi |
| Wifi (4th floor) | AAAA | Canary Wharf, London, UK | Building A | 4 | | | | 12/04/2024 16:09 | 75% | TimeSinceLastReport(5Min) | WiFi |
| Disconnected Laptop at workstation | AAAA | Canary Wharf, London, UK | | | | | | 12/04/2024 17:00 | 100% | None | LAN connection |
| Wifi (4th floor) (last report) | AAAA | Canary Wharf, London, UK | Building A | 4 | | | | 12/04/2024 17:04 | 75% | TimeSinceLastReport(5Min) | WiFi |
| GPS report | AAAA | Canary Wharf, London, UK | | | | | | 12/04/2024 17:10 | 100% | TimeSinceLastReport(5Min) | GPS |
| Booking Ends | AAAA | | | | | | | 12/04/2024 17:30 | 10% | Until(12/04/2024 17:30) | Booking |
| GPS report | AAAA | Out of Geofence | | | | | | 12/04/2024 17:35 | 100% | TimeSinceLastReport(5Min) | GPS |

| Description | PersonID | Region | Building | Floor | Section | Room | Workstation | Timestamp | Confidence | AttritionRule | Origin |
|---|---|---|---|---|---|---|---|---|---|---|---|
| GPS report | AAAA | Canary Wharf, London, UK | | | | | | 12/04/2024 07:45 | | 100%:TimeSinceLastReport(5Min) | GPS |
| Badge swipe building entrance | AAAA | Canary Wharf, London, UK | Building A | | | | | 12/04/2024 07:55 | | 100%:WorkingHoursTimeSinceLastReport(5Min) | Badge Swipe |
| Has booking (not checked in) | AAAA | Canary Wharf, London, UK | Building A | 4 | | Open Plan 1 | Desk 55 | 12/04/2024 08:00 | | 10%:Until(12/04/2024 17:30) | Booking |
| Connected Laptop at workstation | AAAA | Canary Wharf, London, UK | Building A | 4 | | Open Plan 1 | Desk 55 | 12/04/2024 08:08 | | 100%:None | LAN connection |
| Wifi (8th floor) | AAAA | Canary Wharf, London, UK | Building A | 8 | | | | 12/04/2024 13:03 | | 75%:TimeSinceLastReport(5Min) | WiFi |
| Checked in Booking for meeting room | AAAA | Canary Wharf, London, UK | Building A | 8 | | Meeting Room 5 | | 12/04/2024 13:05 | | 90%:Until(12/04/2024 14:00) | Booking |
| Presence detected | | Canary Wharf, London, UK | Building A | 8 | | Meeting Room 5 | | 12/04/2024 13:07 | | 100%:None | Sensor |

520

| Description | PersonID | Region | Building | Floor | Section | Room | Workstation | Timestamp | Confidence | AttritionRule | Origin |
|---|---|---|---|---|---|---|---|---|---|---|---|
| Badge swipe building entrance | AAAA | Canary Wharf, London, UK | Building A | | | | | 12/04/2024 07:55 | | 100%:WorkingHoursTimeSinceLastReport(5Min) | Badge Swipe |
| Has booking (not checked in) | AAAA | Canary Wharf, London, UK | Building A | 4 | | Open Plan 1 | Desk 55 | 12/04/2024 08:00 | | 10%:Until(12/04/2024 17:30) | Booking |
| Disconnected Laptop at workstation | AAAA | | | | | | | 12/04/2024 17:00 | | 100%:None | LAN connection |
| Wifi (4th floor) (last report) | AAAA | Canary Wharf, London, UK | Building A | 4 | | | | 12/04/2024 17:04 | | 75%:TimeSinceLastReport(5Min) | WiFi |
| GPS report | AAAA | Canary Wharf, London, UK | | | | | | 12/04/2024 17:10 | | 100%:TimeSinceLastReport(5Min) | GPS |

Figure 5B

TIME BASED INDOOR LOCATION DETERMINATION

TECHNICAL FIELD

The present disclosure relates to a computer system for determining location estimates for a user.

BACKGROUND

Tracking the location of individuals within certain areas—e.g. facilities or buildings, such as offices or factories or the external grounds or regions—may have important applications for the management of such areas. For example, tracking the location of an individual may be useful for monitoring the attendance of that individual, either at the workplace generally or at particular locations, e.g. at a meeting, within the workplace. The tracking of the location of the individual may also be useful for automating certain processes, e.g. for the checking of the individual into an area.

Typically, the attendance of an individual at work or at meeting may be determined based upon a single source of data, and is often provided either by a check-in or building entry system. For example, a workplace may provide a check-in system where an employee scans a check-in card against a scanner at the start of each work day. A system may then collect a user identifier recorded by the scanner from the card, and store a record that the employee has checked-in. From this information, it may be assumed that the employee is present at the workplace following the check-in. However, continuing to assume that an employee is present based on the information from such a check-in system can frequently result in inaccuracies, since it is quite plausible that the employee may check-in via such a system and then leave the vicinity sometime after doing so. Furthermore, the resolution of the data provided by such a system is typically low, since although the check-in system may indicate the presence of the employee within a large vicinity, it is less likely to provide more detailed information about their location, e.g. whether the employee is in attendance at a meeting at a particular time, with a reasonable degree of accuracy.

SUMMARY

Embodiments are directed towards providing a system and method for tracking a user location and producing one or more estimated locations.

According to a first aspect, there is provided a computer system comprising at least one processor and at least one memory comprising computer readable instructions, the at least one processor being configured to execute the instructions to perform the steps of: obtaining location data derived from a plurality of data sources, wherein for one or more of the data sources, the location data is associated with a user, wherein the location data comprises, for each of the data sources, one or more data points, each of which comprises a location indication, time data associated with the location indication, an indication of the data source from which the location indication was derived, and a confidence score associated with the location indication; producing a location estimate for the user in relation to an area at a given time point by: for each of at least some of the data sources, obtaining one of the data points from amongst the data points associated with the respective data source, the obtained data point having time data that corresponds to the given time point; and providing the location estimate based on the location indications, confidence scores and time data associated with the obtained data points.

According to embodiments, the system obtains data from a plurality of data sources, which are each useful for informing the location of the user in relation to an area, e.g. whether the user is present in the area and, if so, their whereabouts in the area (i.e. particular sub-area of the area in which they are present). For example, the data sources may include GPS data, check-in data, and motion sensor data. To process this data to provide a particular estimated location, the system extracts recent data points belonging to different sources and considers these in combination to produce a reliable estimate for a user's location. For example, data of one source may comprise booking data indicating that a user has booked an area (such as a meeting room or workspace) for a particular time, data of another source may comprise checkpoint data (e.g. building entry data indicating that a user has entered the region (e.g. building) where within which that area is located (e.g. by a card swipe)) prior to that particular time, data of another source may comprise Wi-Fi location data indicating the user is in or proximate to the area at the particular time. By combining this data considering confidence scores associated with each data point (i.e. where higher confidence scores are assigned to data points considered to be more reliable), the system may provide an estimate for the location of the user within the facility as being in the meeting room. Since the data is combined by considering confidence scores associated with different data points, a reliable location estimate may still be provided even if one data source provides a location indication that suggests a different location to another data source. Each confidence score may be adjusted based on the time associated with each data point. The confidence score may change over time, based on a difference between the time associated with the data point, and the time for the location estimate. For example, if wired connection data indicates that a user connected a laptop at 1 pm in room A of building 1, whereas GPS data indicates that the user was present in building 2 at 3 pm, a location estimate for the user at 3:05 pm may be determined by applying a higher confidence score to the more recent GPS data so as to provide an estimate that the user is present in building 2. The process may be performed by the system for each of a plurality of different users with which the system is associated to derive a relevant location estimates.

BRIEF DESCRIPTION OF DRAWINGS

Arrangements of the present invention will be understood and appreciated more fully from the following detailed description, made by way of example only and taken in conjunction with drawings in which:

FIG. 5A illustrates a set of event data points produced by the system from data records relevant to the user that were obtained within a given time period;

FIG. 5B illustrates a first subset of event data points extracted from the set of event data points for determining a location estimate at Dec. 4, 2024 13:05 and a second subset of event data points extracted from the set of event data points for determining a location estimate at Dec. 4, 2024 17:20;

DETAILED DESCRIPTION

Embodiments of the application relate to the processing of multiple items of data from different data sources. Such data sources may be collected by one or more computing devices belonging to the system. The data collected by the different sources is transmitted to a data processing system, where it is processed in order to determine a location estimate for a user based on the collected data. Each data point received and processed by the system comprises a location indication, a confidence score associated with the location indication and a timestamp. The confidence score may be adjusted for time elapsed since the data was collected, and then used in the evaluation of the location estimate and may be used to resolve conflicts between location indications from different data sources and/or to provide a confidence associated with the determined location estimate.

Figure 1:
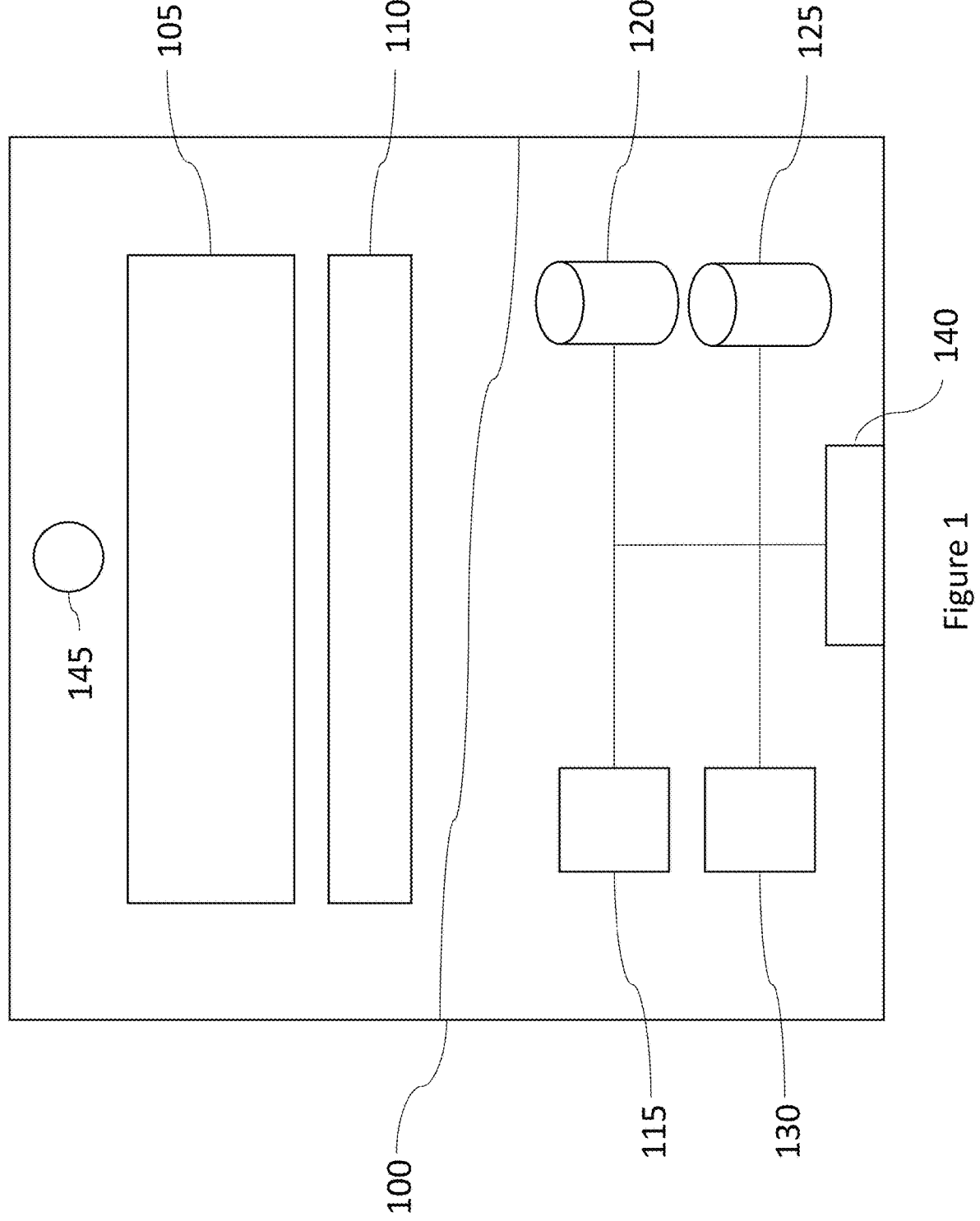
FIG. 1 shows an example computer system in which embodiments may be implemented.
Figure 2:
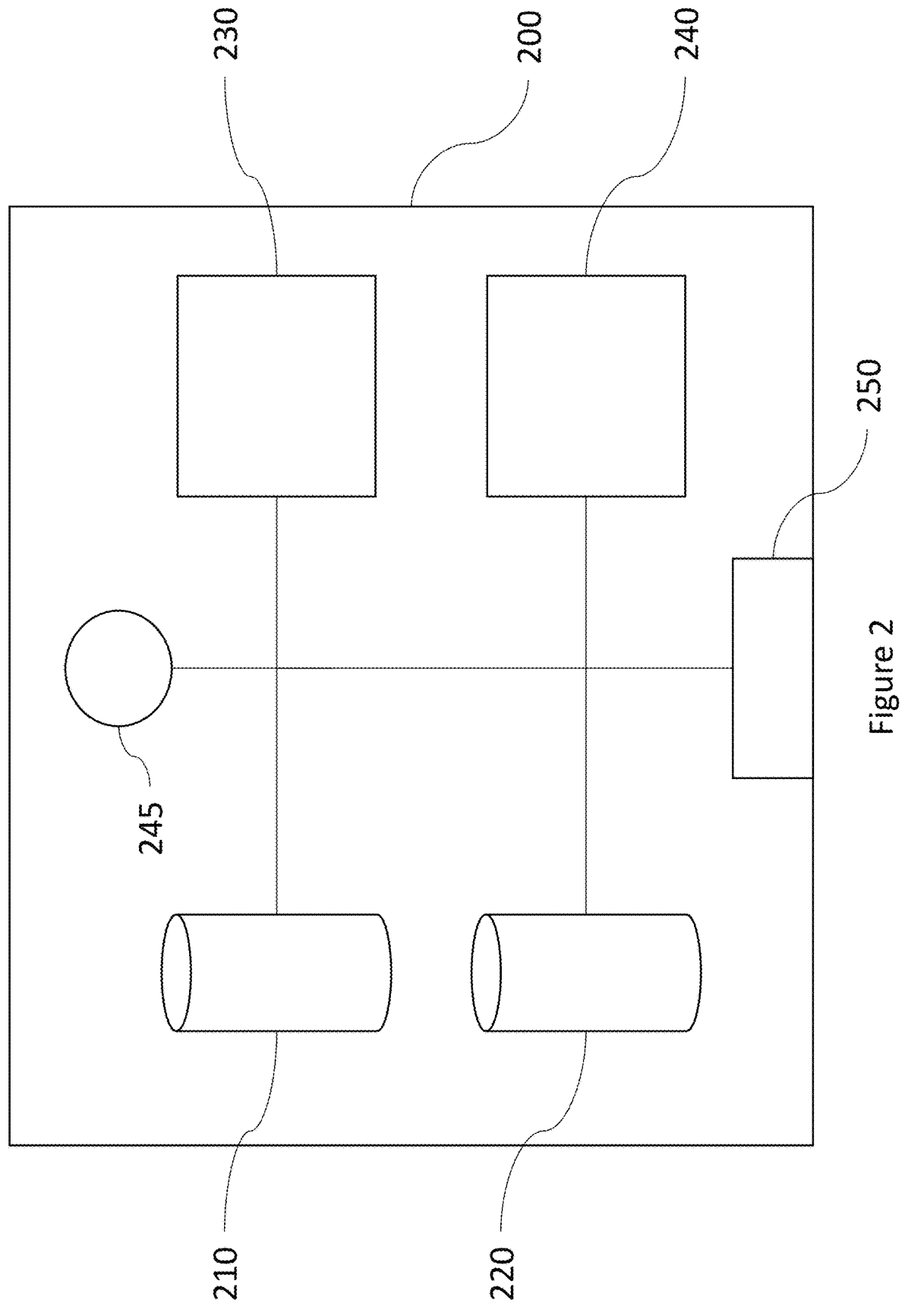
FIG. 2 shows a further example computer system in which embodiments may be implemented.

FIGS. 1 and 2 shows example of computing devices that may be used to provide each of the data sources and/or the data processing system.

Reference is made to FIG. 1, which illustrates a computer device 100. The device 100 may be a mobile user equipment (UE), a personal computer (PC), a terminal or workstation, a server, or some other form of device.

The device 100 comprises an interface 140 over which it sends and receive signals. The interface 140 may be a wired or wireless interface. For instance, the interface 140 may comprise a wired interface for connection to a wired network (e.g. a local area network and/or the internet). Alternatively or in addition, the interface 140 may comprise transceiver apparatus configured to send and receive communications over a radio interface. The transceiver apparatus may be provided, for example, by means of a radio part and associated antenna arrangement. The antenna arrangement may be arranged internally or externally to the device 100.

The device 100 is provided with at least one data processing entity 115, at least one random access memory 120, at least one read only memory 125, and other possible components 130 for use in software and hardware aided execution of tasks it is designed to perform, including control of, access to, and communications with access systems and other communication devices. The at least one random access memory 120 and the hard drive 125 are in communication with the data processing entity 115, which may be a data processor. The data processing, storage and other relevant control apparatus can be provided on an appropriate circuit board and/or in chipsets. A user controls the operation of the device 100 by means of a suitable user interface such as key pad 110, or by voice commands. A display 105 is included on the device 100 for displaying visual content to a user. The device 100 may also comprise a speaker for providing audio content.

The memory of the device 100 (i.e. the random access memory 120 and the hard drive 125) is configured to store computer readable instructions for execution by the data processor 115 to perform the data processing functions described herein as being performed by the device 100.

The device 100 may include a sensor 145, which may capture data according to one or more sensors. For example, the sensor 145 could be a camera 145 used to obtain visible light images for detecting the presence of one or more people at a location. The sensor 145 could alternatively be an infrared camera 145 for detecting motion in the vicinity of the device 100. The sensor 145 could comprise a sensor for detecting presence of a card or tag associated with a user, in which case the sensor 145 may take the form of a radio-frequency identification (RFID) reader device 145.

Reference is made to FIG. 2, which illustrates an example computer system 200. The system 200 is shown as a single enclosed apparatus. However, in some embodiments, the system 200 is a distributed system, with multiple data processing apparatuses operating in communication with one other. The system 200 may comprise a server, back-end system, or the like.

The system 200 comprises at least one random access memory 210, at least one hard drive 220, at least one data processing unit 230, 240 and an input/output interface 250. The memories 210, 220, store computer readable instructions for execution by the processing units 230, 240 and data for processing performed during execution of the instructions. The data stored in the memories 210, 220 may comprise data collected from one or more data sources. The system 200 may additionally send via the interface 250, the results produced by the processing performed by the data processing units 230, 240.

The system 200 may also include a sensor 245, which may capture data according to a particular data source type. As with the sensor 145 discussed above, the sensor 245 may detect visible light, infrared or be an RF detector, amongst other possibilities.

Figure 3:
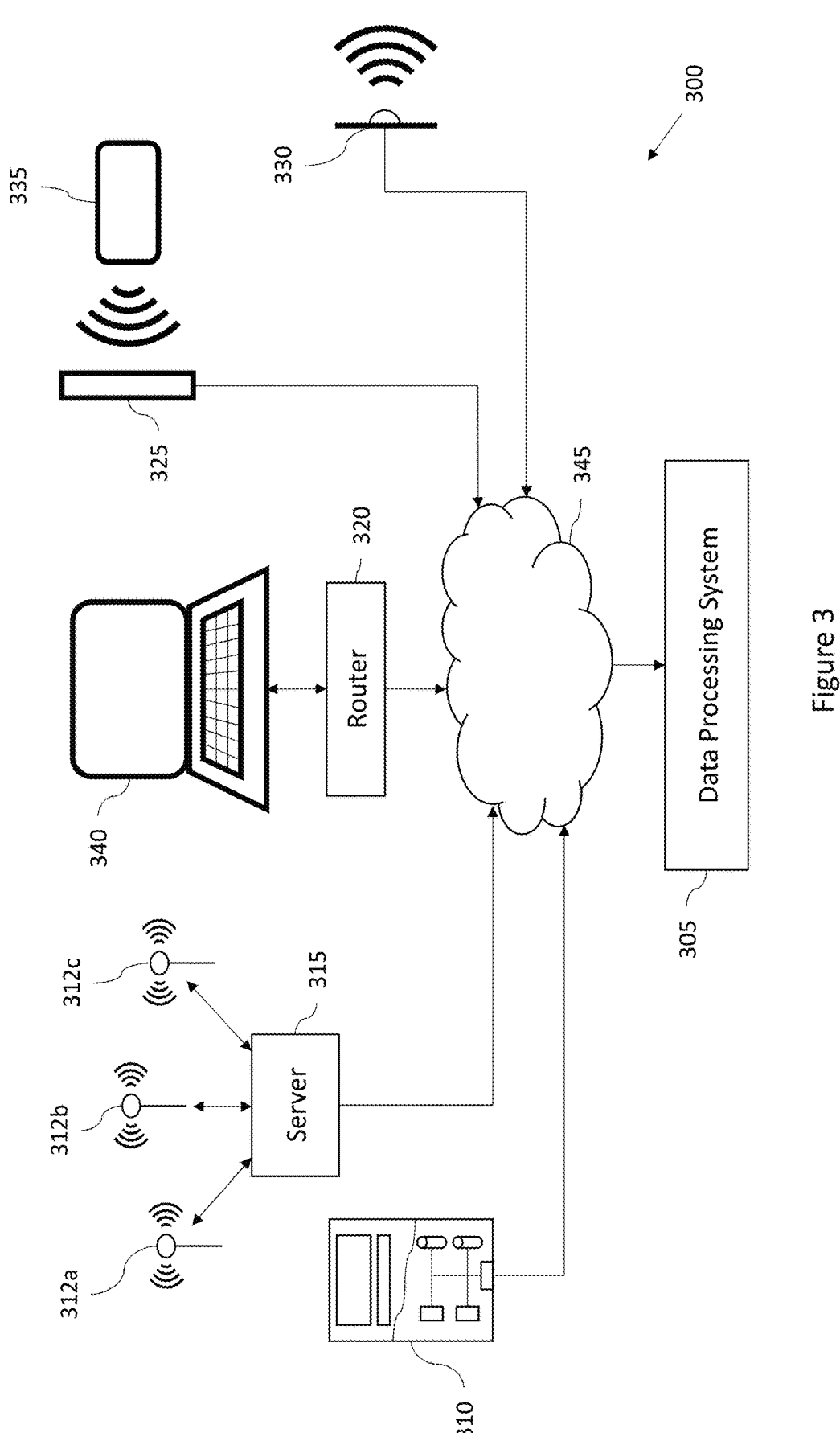
FIG. 3 illustrates a system in which different devices may supply data indicating a location of a user to a data processing system for processing.

Reference is made to FIG. 3, which illustrates an example of a system 300 comprising multiple devices 310, 315, 320, 325, 330, 340 for collecting different types of data, which each provide an indication of a location of a user. The different types of data may each be referred to as being data originating from a particular data source. Each of the devices 310, 315, 320, 325, 330, 340 is configured to provide the collected data over a network 345 to a system 305. The data collected by the devices 310, 315, 325, 330, 340 may be referred to as raw data, which is formed of raw data records. As will be described, the raw data is subject to processing to covert that data into a format that is the same for the different types of data.

Reference in the following description to operations performed by any of the devices 310, 315, 320, 325, 330, 340 is understood to be a reference to operations performed by processing circuitry of the relevant device and/or to operations performed in response to the execution by a processor of the device of computer executable instructions stored in at least one memory of the device. Similarly, reference to operations performed by the system 305 is understood to be a reference to operations performed by processing circuitry of the system 305 and/or to operations performed in response to the execution by a processor of the system 305 of computer executable instructions stored in at least one memory of the system 305. Each of the system 305 and the devices 310, 315, 320, 325, 330, 340 may be provided by one of the example device/systems 100, 200 discussed above with respect to FIGS. 1 and 2.

The device 310 may be a user device 310, and may collect data indicating the location of the device 310 itself. This location data of the device 310 may comprise one or both of global positioning system (GPS) data indicating the position of the device 310 or Bluetooth based positioning data indicating the position of the device 310. Each of these different types of location data corresponds to a different data source, even if each type of location data originates from the same device 310. Since the device 310 is associated with a particular user, the data indicating the position of the device 310 also provides an indication with a certain level of confidence of the position of the user. The device 310 may collect the location data periodically, i.e. the device 310 may create a data record comprising a location indication derived from one of the data sources providing an indication of the location of the device 310 once every predefined period of time. The indication of the location obtained by the device 310 comprises co-ordinate data. The device 310 may store the co-ordinate data in a data record and provide this as part of the raw data sent to the system 305.

Alternatively, the device 310 may provide a geofence identifier that identifies a region (e.g. a building or a room) within a defined geographical boundary.

In some embodiments, the device 310 may collect GPS data. The GPS data may be collected periodically to produce a series of data reports. The collection of the GPS data, including the periodicity with which the GPS data is collected may be controlled by an application running on the device 310. Each of these data reports may include an identifier associated with the user (which may be an identifier of the device 310 or a user identifier per se), a timestamp indicating the time at which the relevant GPS location indication was obtained, the location indication in the form of GPS co-ordinates (including latitude, longitude and altitude), and a precision indicator. The precision indicator indicates the level of confidence in the reported co-ordinates and may indicate the level of accuracy associated with the co-ordinates. The precision indicator may be a fixed precision indicator associated with the device 310 and provided by the device 310. Alternatively, the device 310 may update the precision indicator based on patterns in recently collected data, e.g. if there is high variance in the recently collected location data reports. As noted above, the location indication in each of the data records may, instead of taking the form of co-ordinates, take the form of a geofence identifier identifying one of the geographical areas within which the device is located. The device 310 may determine the geofence identifier by comparing obtained GPS co-ordinates to stored set of predefined boundaries for different geofences defined across an area for which user location tracking is performed in order to determine which geofence the GPS co-ordinates fall within. The device 310 then produces a data record comprising the geofence identifier corresponding to the determined geofence.

In some embodiments, the device 310 generates personal area network (such as a wireless personal area network, e.g. Bluetooth) based positioning data. Throughout the description, the example of this given is Bluetooth based positioning data. However, it is not excluded that another personal area networking technology could instead be used to provide similar positioning data. In order to generate the Bluetooth based positioning data, the device 310 may communicate with a plurality of Bluetooth low energy beacons in the vicinity of the device 310 and analyse the strength of signals received from the plurality of beacons to determine the location of the device 310 using a multilateration algorithm. Each of these data records may include an identifier associated with the user, a timestamp indicating the time at which the relevant location indication was obtained, a precision indicator indicating the level of confidence in and/or accuracy of the location identifier. The identifier associated with the user, the timestamp, and the precision indicator may each take the same form as discussed above with respect to the GPS data. Each of the Bluetooth based data records additionally comprises an identifier of one of a set of sub-areas in which the device 310 is located. This may be determined by data received from one or more of the beacons, indicating the sub-area in which the beacons (and therefore the device 310) are located. The sub-area is part of the overall area within which the location tracking of the user is performed by the system 305 and may, for example, be a particular floor of a building in which the device 310 is located. Each of the data records comprises co-ordinates indicating the location of the device 310 within the identified sub-area. The sub-area therefore provides a reference frame for the co-ordinates indicating the location of the device 310.

Although it has been described that the device 310 itself determines its location on the basis of signals received from the Bluetooth beacons, the location determination and the generation of the Bluetooth based data records may be performed by a separate server (e.g. server 315) that interfaces with the beacons and/or the device 310.

A further type of location data providing co-ordinates within a reference frame may be local area network (such as a wireless local area network, e.g. Wi-Fi) based positioning data. Throughout the description, the example of this given is Wi-Fi based positioning data. However, it is not excluded that another local area networking technology could instead be used to provide similar positioning data. This location may be determined by a server 315 in communication with a number of wireless access points 312*a-c*. Each of the wireless access points 312*a-c* may communicate with the device 310 and provide data regarding the communications, e.g. determined signal strength, to the server 315. The server 315 then performs triangulation to determine a position (in the form of a set of co-ordinates) of the device 310. The server 315 produces a series of data records indicating the position of the device 310. Each of the data records an identifier associated with the user, a timestamp indicating the time at which the relevant location indication was obtained, a precision indicator indicating the level of confidence in and/or accuracy of the location identifier, and a sub-area identifier. The server 315 may determine the sub-area identifier based on the known locations of the access points 312*a-c*. Each of the data records comprises co-ordinates indicating the location of the device 310 within the identified sub-area.

A further user device 340 is also shown in FIG. 3. This user device 340 may also be configured to obtain location data (such as GPS data, Bluetooth location data) indicating its location. Additionally or alternatively, the server 315 may be configured to obtain location data (such as Wi-Fi positing data) indicating the location of the device 340. This location data may also be provided to the system 305 in addition to the location data associated with the device 310 and the system 305 may consider location data associated with both devices 310, 340 when estimating the location of the user.

Also shown in FIG. 3 is a router 320, which is associated with a plurality of ports via which a user device 340 may obtain network access. The ports are wired ports by which the user device 340 may connect to another device and are, therefore, associated with a particular fixed location. When the user device 340 accesses a particular wired port (e.g. by a wired connection being made between the device 340 and the relevant port), the router 320 may determine an identifier of the device 340 (e.g. in the form of a MAC address or a user ID) and the port that the device 340 has accessed. The router 320 may also determine the port number to which the device 340 is connected. The router 320 may also determine the time interval between connection and disconnection of the device 340 from the port. This information may be provided as a data record (including a user identifier, time interval, and a port number), which is reported by the router 320 to the data processing system 305. Alternatively, the data record may be collected and reported by a separate server (not shown in FIG. 3) in communication with the router 320.

Since the user device 340 is a device associated with a given user, the location of that device 340 provides an indication of the location of the user. Although, the devices 310, 340 are shown as separate devices in FIG. 3, in some embodiments there may just be a single device for which the co-ordinate data (e.g. GPS, Bluetooth based, Wi-Fi based) and wired connection data are both obtained.

Another type of information that may be provided by one or both of the user devices 310, 340 or by another device not shown in FIG. 3, is an indication of expected presence of the user at a given place for a given time. This may be referred to as booking data. This information may be generated in response to user input on the relevant device. The information may comprise a user identifier, a time interval (indicating a start and end time), and a resource identifier. The resource identifier may identifier a resource (e.g. a room or a workstation) that has been booked by the user and at which the presence of the user is expected during the time interval.

FIG. 3 further shows a detector 325 for detecting the presence of a card 335 (or alternatively a tag). The detector may be a radio frequency ID detector. The detector may provide for monitoring of the location of the user based on detection of the presence of the card 335 in close proximity to the detector 325. This may be indicative that the user has passed a checkpoint or entered a particular location, e.g. entering a building, since the detector may be associated with an entry system. For example, the card 335 may be an entry card or clock-in card, which the user places in proximity to the detector 325 in order to gain access to a building or to provide evidence that they are present in the building.

When the detector 325 detects the presence of the card 335, the detector records certain information in a data record that is provided to the system 305. The recorded information for a data record producing response to one instance of detection includes a user identifier associated with the card 335, a timestamp indicating the time of detection, an identifier of a sub-area (e.g. building or floor), and may also include an event type (e.g. whether the event is entry/exit). The user identifier may an identifier that is provided as part of the card 335.

The identifier of the sub-area may be dependent upon the location of the detector 325 and the same identifier may be generated as part the relevant data record whenever the detector 325 is scanned. The event type may be set to be the same for a particular detector, e.g. each scan of the card 335 against the detector generates a data record of the same event type. Alternatively, the event type may be dependent upon the most recent scan by a particular card 335, e.g. if a first scan against the detector 325 by a particular card 335 may be registered as an entry, whilst a second scan against the detector 325 by that card 335 may be registered as an exit.

FIG. 3 further shows a sensor 330, which may detect the presence of a person at a particular location. The sensor 330 may detect movement, sound, pressure applied to the sensor

330, temperature or combination of two or more of these. The sensor 330 may, for example, detect a combination of movement and temperature. The sensor 330 may also be able to detect other quantities. In some embodiments, the system 300 may comprise multiple sensors, each configured to measure a different one of these quantities.

In the case that the sensor 330 detects movement, the sensor 330 may be a visible light sensor or may be an infrared sensor. When the sensor 330 is triggered, the information generated for supply to the system 305 may include an identifier of the sensor (e.g. sensor ID) or an indication of a location of the sensor (e.g. the room or desk at which the sensor is located). The information generated may include a timestamp or time range indicating when the relevant measurement of the sensor was made. The information may, optionally, include a confidence factor, which may be determined based on the magnitude of sensor output, e.g. how much movement is detected. In some cases, the sensor 330 may determine the presence of a particular person, e.g. by determining when a measured quantity (such as temperature or pressure) exceeds a given threshold, and outputs, as part of the information supplied to the system 305, an indication of the presence of a person. In other cases, the sensor 330 outputs the collected measurement data, e.g. temperature or pressure, as part of the information supplied to the system 305. The system 305 may then make a determination as to whether this collected measurement data indicates the presence of a person and, if so, creates a data point (e.g. belonging to data set 500 discussed later) indicating that the presence of the person has been detected. In some embodiments, the information collected by the sensor 330 may be capable of providing an estimate of the number of people in a particular room.

Figure 4A:
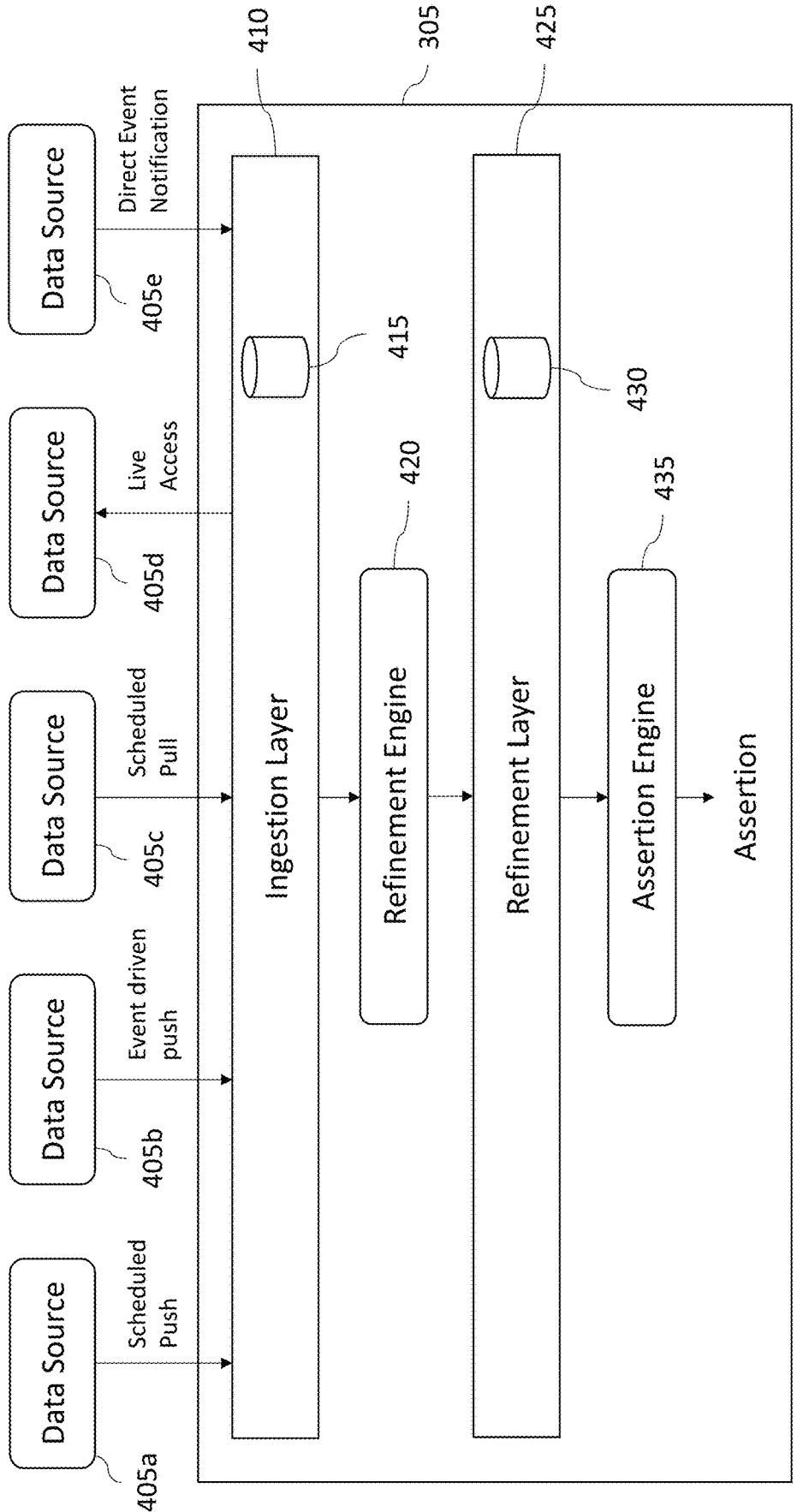
FIG. 4A illustrates the processing by the data processing system of data records obtained from different data sources.

Reference is made to FIG. 4A, which illustrates how the system 305 may receive and process the data belonging to different sources 405*a-e*. Each of the data sources 405*a-e* is a device providing a different type of data—e.g. the GPS data, Wi-Fi positing data, booking data. However, the data sources 405*a-e* are not limited to each being different devices. For example, both data source 405*a* and data source 405*b* could correspond to different types of data originated from a same user device 310.

The data sources 405*a-e* may supply the raw data discussed above to the system 305 by different mechanisms. Different examples are shown in FIG. 4A. Data source 405*a* may provide data to the system 305 by means of a scheduled push in which the data source 405*a* pushes data of the respective data type that has been collected since the last push and provides it to the system 305. The scheduled push may take place periodically. Data source 405*b* may provide data to the system 305 by means of an event driven push, in which the data source 405*b* pushes data of the respective data type to the system 305 in response to a particular event. Data source 405*c* may provide data to the system 305 by means of a schedule pull in which the system 305 pulls data from the data source 405*c* that has been collected since the last pull. The system 305 performs the pull of the data at scheduled times, e.g. periodically. The data source 405*d* may provide live access to the data it collects. In this case, the system 305 may obtain the data from the data source 405*d* as it is created at the data source 405*d*. The data source 405*e* may provide to the system 305 each of its data record when that data record is created.

The system 305 provides an ingestion layer 410, which receives the raw data records obtained from the plurality of data sources 415 and stores this data in storage 415 until the raw data is processed. Each set of raw data records from a given data source may provide information defining one or more periods over which a user location is determined to be at a given location. Each such period may be referred to as a 'presence period'. The system 305 may store information defining a plurality of presence periods, where for each presence period the information includes: a start time of the period (this may be defined by the timestamp of the first raw data record indicating the location for the presence period), an end time (this may be defined by the timestamp of the earliest raw data record indicating a different location for the presence period or by an end time defined for the raw data record), an location indication for the presence period (which could take the form of a discrete identifier or co-ordinate data). Optionally, for one or more of the presence periods, the information may also comprise an identifier of the user, and/or a precision indicator which may be copied from the corresponding raw data record/s.

Figure 4B:
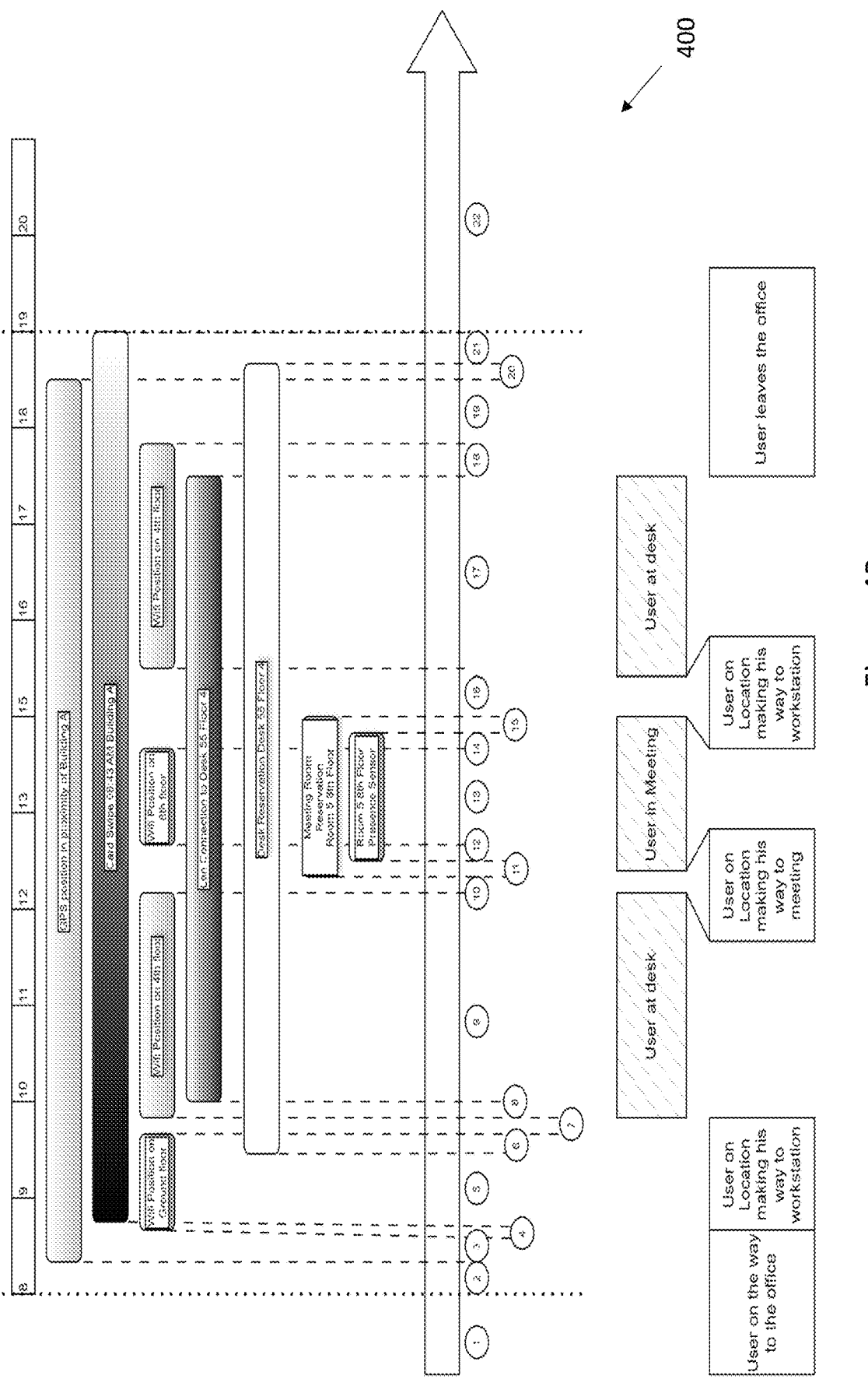
FIG. 4B illustrates how the data records from different data sources form a plurality of presence periods for a user.

Reference is made to FIG. 4B, which illustrates a plurality of presence periods that the system 305 may define based on raw data records received from different sources. Each of the numbered points (numbered 1 to 22) in the timeline 400 represents a different raw data record. The location indications represented by the numbered points and the associated precision indications are represented in table 1 below. The system 305 defines a series of presence periods, e.g. having labels 'Wi-Fi Position on Ground floor' and 'Desk Reservation Desk 55 Floor 4', over the time period shown in the timeline 400.

TABLE 1

| Id | Recorded position | Precision |
|---|---|---|
| 1 | Unknown/Out of office hours | n/a |
| 2 | Unknown-Within office hours | n/a |
| 3 | Building A | 100 m (GPS) |
| 4 | Building A-Ground Floor | Ground floor 25 m (Wi-Fi) |
| 5 | Building A | Confirmed 100% (Car swipe deprecates over time) |
| 6 | Building A-Ground Floor, expected Floor 4 | Ground floor 25m (Wi-Fi) Expected Floor 4 (booking) |
| 7 | Building A Floor 4 Desk 55, Expected | Desk 55 (booking) |
| 8 | Building A Floor 4 Desk 55 | Floor 4 (Wi-Fi) desk 55 (booking) |
| 9 | Building A Floor 4 Desk 55 | Desk 55 (Wired LAN) and 4th floor (Wi-Fi) desk 55 (booking) |
| 10 | Building A Floor 4 Desk 55 | Desk 55 (Wired LAN) desk 55 (booking) |
| 11 | Building A Floor 4 Desk 55, Expected Floor 8 Room 5 | Desk 55 (Wired LAN) desk 55 (booking) Expected Floor 8/Room 5 (Booking) |
| 12 | Floor 8 Room 5 Floor 4 Desk 55 | Floor 8 Room 5 (Sensor/Booking) Desk 55 (Wired LAN) desk 55 (booking) |
| 13 | Floor 8 Room 5 Floor 4 Desk 55 | Floor 8 Room 5 (Sensor/ Booking) + Wi-Fi (floor 8) Desk 55 (Wired LAN) desk 55 (booking) |
| 14 | Floor 8 Room 5 Floor 4 Desk 55 | Floor 8 Room 5 (Booking) (sensor Desk 55 (Wired LAN) desk 55 (booking) |
| 15 | Floor 8 Room 5 Floor 4 Desk 55 | Floor 8 Room 5 (Booking) (no sensor) Desk 55 (Wired LAN) desk 55 (booking) |
| 16 | Building A Floor 4 Desk 55 | Desk 55 (Wired LAN) desk 55 (booking) |
| 17 | Building A Floor 4 Desk 55 | Desk 55 (Wired LAN) and 4th floor (Wi-Fi) desk 55 (booking) |
| 18 | Building A Floor 4 Desk 55 | 4th floor (Wi-Fi) desk 55 (booking) |
| 19 | Building A Floor 4 Desk 55 | desk 55 (booking) |
| 20 | Building A Floor 4 Desk 55 | desk 55 (booking) GPS not in range of building |

10

TABLE 1-continued

| Id | Recorded position | Precision |
|---|---|---|
| 21 | Unknown/within Office hours | n/a |
| 22 | Unknown/Out of office hours | n/a |

The system 305 provides a refinement engine 420, which is configured to process the raw data to provide the data in a format that is common across the different types of data. The data in this common format comprise data points corresponding to the raw data records. Each such data point may be referred to as an event data point.

Reference is made to FIG. 5A, which illustrates a set of data points provided according to the common format including a plurality of fields. Each of the items of data is associated with a particular event (e.g. GPS report, booking end, Wi-Fi location detection). The plurality of fields for the common format includes a descriptor indicating the data source for the respective event, a user identifier associated with the event, a location indication associated with the event, a timestamp, a confidence indication, an attrition rule, and an indication of the data source (shown as origin in the table of FIG. 5A).

The user identifier uniquely identifies the user from other users for which the system 305 is configured to generate location estimates. However, the user identifier included in the data points in the common format may be an identifier that provides anonymity to the user, whilst distinguishing that user from other users. The identifier may, for example, be a hashed identifier that the system 305 generated by hashing the user identifier present in the raw data records. For some data points derived from certain sources, the raw data record may not be associated with specifically with the user, but may be relevant to the user's location. An example of this is a motion sensor detector, which provides indication of the presence of a person at a particular location without any indication of the identity of the person. In this case, the data point may be provided with an empty user identifier field.

The location indication is discrete identifier, i.e. it identifies one of a plurality of sub-areas within the area for which location tracking is performed by the system 305. In embodiments, the location indication takes the form of a hierarchy of areas for which location indications are provided, where the areas are nested within higher levels of the hierarchy. In the example of FIG. 5A, the hierarchy includes a region, a building, a floor, a section, a room, and a workstation. At each level of the hierarchy, the field indicates the location of the user that is suggested by the respective event represented in the corresponding raw data record. Therefore, the location fields include a field indicating whether the event suggests that the user is within a particular region (in this case 'Canary Wharf'), a field indicating the building within the region, a filed indicating the floor within the building, a field indicating the section within the floor, a field indicating the room within the floor/section, and a field indicating the workstation within the room. It would be appreciated that not every event provides an indication for every level of the hierarchy. For example, a badge swipe at the entrance to the building provides an indication as to the building in which the user is likely to be present, but does not indicate any finer levels in the hierarchy (e.g. floor, section, room, workstation).

The timestamp may be determined by the system 305 based on the time information (e.g. timestamp or time interval) in the raw data received by the system.

The confidence score is determined by the system 305 in dependence upon the data source and may be determined in dependence upon the confidence indication that, in some instances, is provided in the raw data.

The attrition rule may be determined by the system based on the data source. The attrition rule indicates how the confidence in the data record is affected by elapse of time since the event took place, and therefore how much weight is given to this data record when determining a location estimate.

One of the event types for which a data point is provided in the example data set 500 is the detection of the presence of a person. In the example shown in FIG. 5A, this is shown as being an indication that a person is present. However, in other embodiments, such a data point may also comprise an indication/estimate of the number of people present. The indication/estimate of the number of people present may be derived (either at the sensor 330 itself or at the system 305) on the basis of one or more measured quantities (e.g. of temperature, movement, audio).

Figure 6:
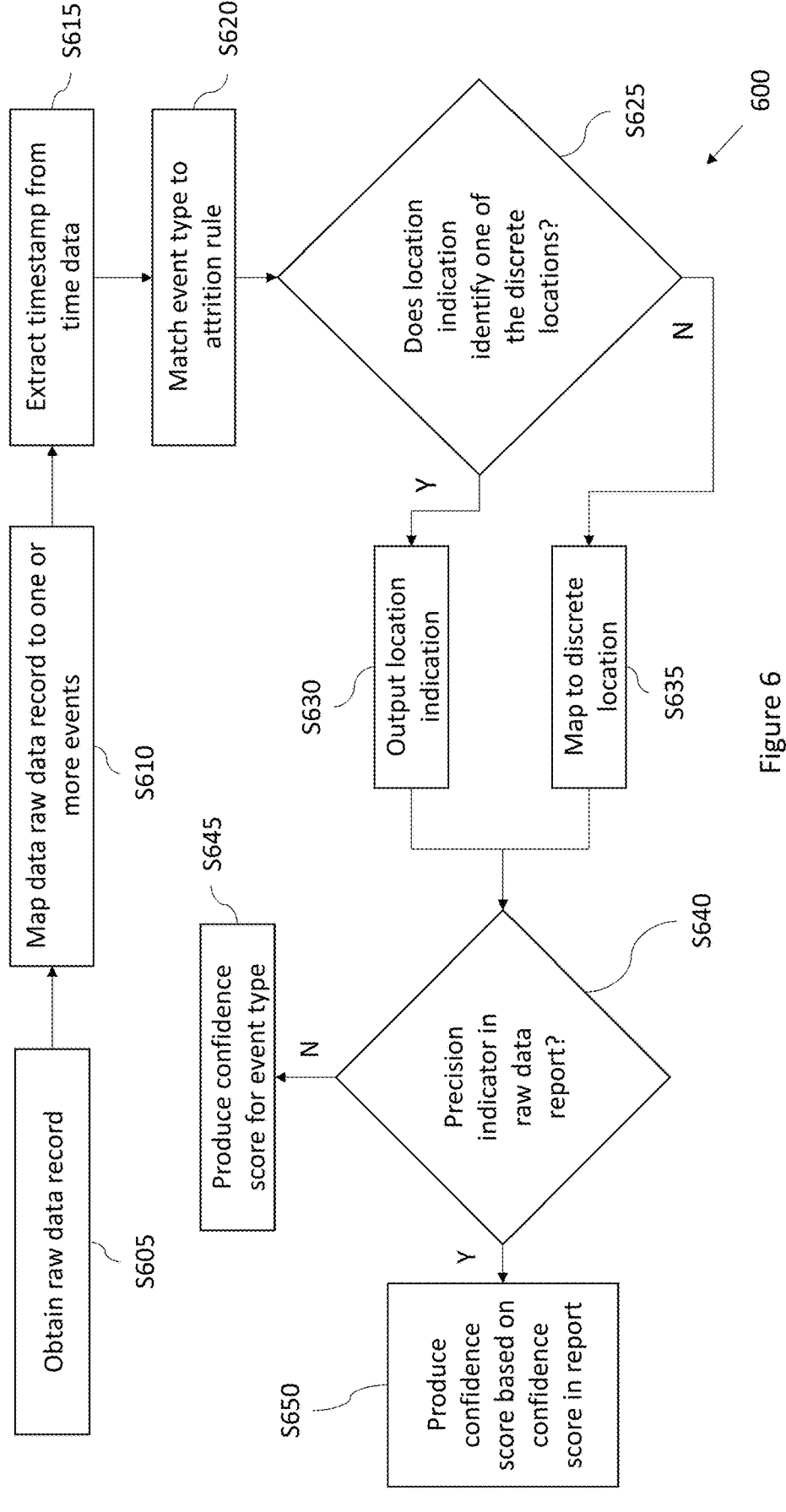
FIG. 6 illustrates a method for creating one or more data points in a standard format based on a raw data record.

Reference is made to FIG. 6, which illustrates a method 600 for producing the data point in the common format from the raw data record. The steps of the method 600 may be performed for each of the most recent raw data records available from each data source to produce a plurality of data points associated with each data source. At S605, the system 305 obtains a raw data record from one of the data sources as discussed above with respect to FIG. 4A.

At S610, the system 305 maps the raw data record to one or more events. The raw data record may map to a single event. For example, if a raw data record is a record of a GPS report, this may be mapped to a GPS report event. If the raw data record is a booking occurring over a time interval, this may be mapped to a first event having an event type of 'booking starts' and a second event having an event type of 'booking ends'. At S610, the system 305 creates a data point for each event determined from the raw data record, and includes in the data point the user identifier and data source identifier extracted from the raw data record. The steps of method 600 following S610 are performed for each of the events identified from the raw data record.

At S615, the system 305 extracts a timestamp from the time data in the raw data record and provides this as a timestamp in the data point. This step may comprise copying the timestamp from the raw data record or may comprise determining a timestamp as being the start or end of a time interval in the raw data record.

At S620, an attrition rule is determined for the data point. This is assigned to the data point based on the event type. The confidence in certain types of events may decay over time. For example, if the type of event is GPS report, this may be mapped to an attrition rule referred to as 'TimeSinceLastReport(t)', which dictates a degradation in reliability of the report the further it gets from the timestamp of the report. The value of 't' indicates the rate of degradation and may indicate, for example, the amount of time until the confidence score falls to half of its initial value. A further attrition rule that may be mapped to one or more event types may be referred to as WorkingHoursTimeSinceLastReport (t) and indicates that the confidence decays over time (as for 'TimeSinceLastReport(t)), but that there is a cut-off at a certain time (e.g. end of the working day) after which the confidence is set to zero. A further attrition rule that may be mapped to one or more may be referred to as Until(ts), and indicates a cut off time (ts) after which the confidence for the data point is set to zero. Some of the events are assigned an attrition rule indicating that the confidence in the data point is not effected by passage of time. When an attrition rule for the event is determined at S620, the event data point is updated to include this attrition rule.

At S625, the system 305 determines whether the location indication in the raw data record directly is a discrete identifier of one of the sub-areas (e.g. floor, room) within the area for which the analysis is performed. For some event types, such as a room booking, the location indication may take this form. If one of the discrete locations is identified in the raw data record, the method 600 proceeds to S630 at which the location indication is output as part of the data point in the hierarchical form discussed above. If not, the method 600 proceeds to S635 at which the location indication is mapped to one of the discrete locations.

At S635, the system 305 maps the location indication in the raw data record to one of the discrete locations, which are sub-areas of the overall area. This may be performed when the location indication takes the form of coordinate data. In such a case, the system 305 determines a particular set of boundaries or ranges within which the coordinates fall, and then outputs an indication of a discrete location corresponding to this particular set of boundaries. For example, the boundaries for a particular room within a floor may be 0m<x<7m and 3m<y<7m, where the boundaries are defined based on the reference frame given for the floor. If the coordinates in a raw data record indicate a user device location as being (3.2 m, 4.7 m), the location indication in the raw data record is determined to correspond to the room defined by the boundaries and an identifier of the room is output in the location identifier for the event data point.

At S640, the system 305 determines whether a precision indicator is provided in the raw data report. If not, the method 600 proceeds to S645 at which the confidence score for the event is provided based on the event type. Certain data sources may have confidence scores with which they are associated and all events associated with that data source are provided with the same confidence score. For example, data points of the event type 'booking ends' may each be assigned a confidence score of 10%.

If the raw data report includes a precision indicator, at S650, the system 305 uses this precision indicator to output a confidence score. The precision indicator may comprise the confidence score itself and so at S650, the system 305 uses the confidence score from the raw data report as the confidence score in the event data point. Alternatively, the precision indicator may be an accuracy indicator, and the system 305 converts the accuracy indicator into a confidence score.

Referring back to FIG. 4A, the refinement engine provides the event data points determined in accordance with method 600 to the refinement layer 425, where they are stored in storage 430 of the system 305. The system 305 provides an assertion engine 435 that provides location estimates based on the event data points. The location estimates may be generated based on at least the most recent data point of each data source. The most recent data point may be defined as the data point having a timestamp that is most recent to the time for which the location estimate for the user is being provided.

Figure 7:
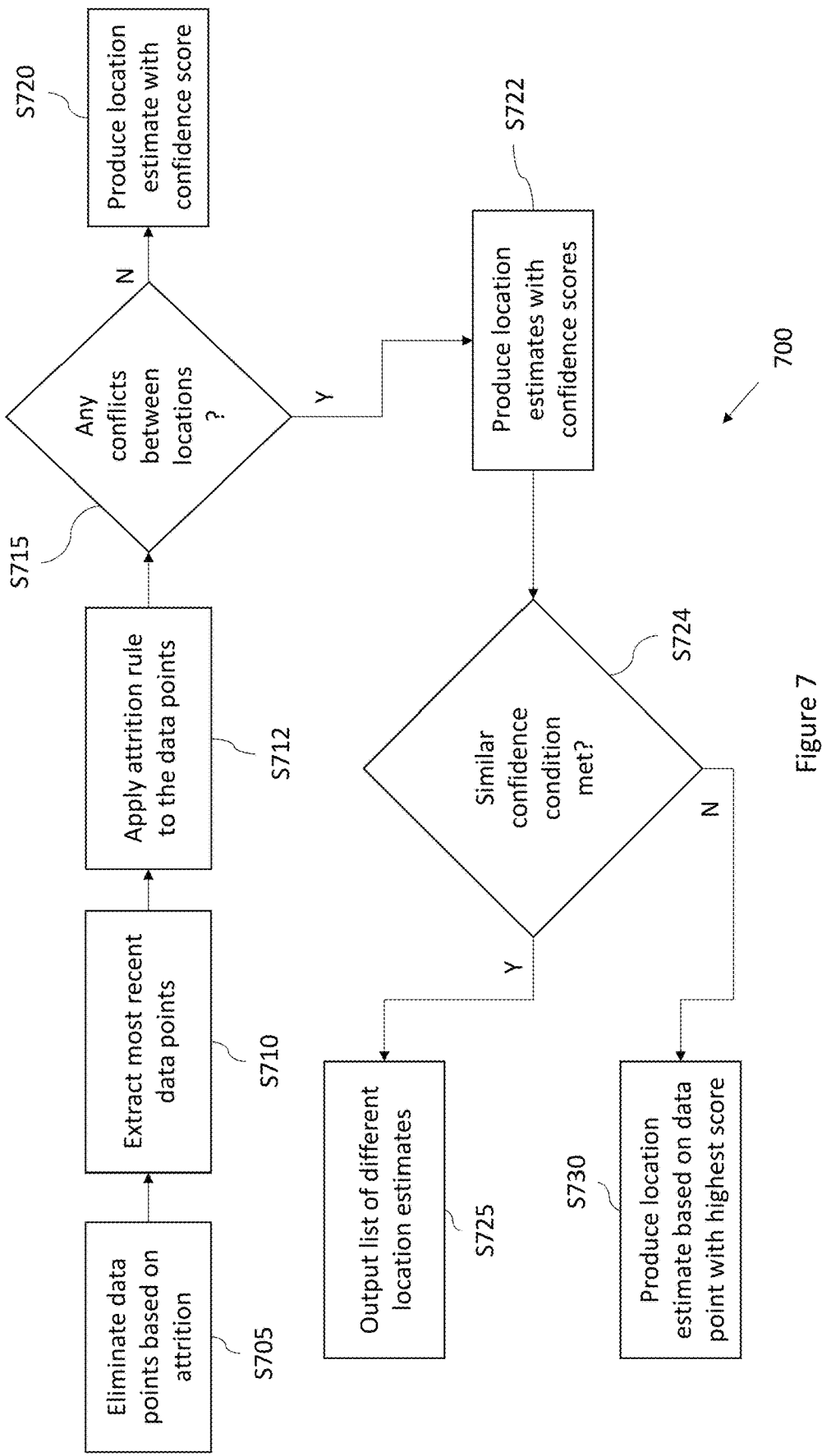
FIG. 7 illustrates a method for determining a location assertion based on the location indicators and confidence scores in the data points.

Reference is made to FIG. 7, which illustrates a method 700 performed by the system 305 for generating a location assertion from a set of data points. A location assertion comprises a single location estimate in the case that the data points comprise consistent location indicators or in the case that the single location estimate can be resolved from the data points with a high degree of confidence. Alternatively, if the system 305 determines a plurality of conflicting location estimates, each with a similar confidence level, the location assertion may comprise each of the conflicting location estimates. The steps of the method 700 are performed at a particular point in time based on past data points collected from different data sources.

At S705, the system 305 eliminates certain data points from the set of data points based on the attrition rules associated with those data points, the time for which the location estimate is generated, and the timestamp of the data point. In this way, data points no longer being relevant to the location of the user are not given consideration when determining the location estimate. As an example, the system 305 may be configured to perform the method 700 to determine a location estimate for the user at Dec. 4, 2024 17:20 and the system 305 may store a data point for that user indicating that the user checked in to a booking for a meeting room at Dec. 4, 2024 13:05 (as in the example data set shown in FIG. 5A). Since the attrition rule for the booking data point indicates that the data point is valid until Dec. 4, 2024 14:00, the system 305 excludes this data point from the set of data points used to determine the location estimate. In this way, the system 305 excludes data points that are no longer valid (as dictated by the attrition rule) based on the time elapsed since the event represented by the data point (which is at the time indicated by the timestamp of the data point) and the time for which the location estimate is provided.

At S710, the system 305 extracts the most recent data points related to each of the different data sources for which event data points have been collected. For each of the data sources, the system 305 extracts one of the data points associated with that data source to provide a reduced data set containing relevant data points for obtaining a location estimate. Reference is made to FIG. 5B, which illustrates examples of subsets of data points 510, 520 that may be collected at different times from the set of available data points shown in FIG. 5A. The subset of data points 510 represents data points extracted for determining a location estimate at Dec. 4, 2024 13:45. The data points 510 are a subset of the reduced set of data points obtained at S705 having, for each of at least some of the data sources, the data point with the timestamp that is most recent to the time of Dec. 4, 2024 13:45. For example, the data set 500 in FIG. 5A includes three data points of the data source 'GPS', having timestamps Dec. 4, 2024 07:45, Dec. 4, 2024 17:10, Dec. 4, 2024 17:35. Since the data points with the 17:10 and 17:35 timestamps are later in time than 13:45, the data point with timestamp 07:45 is the most recent data point and is extracted from the data set 500 for inclusion in the data set 510. On the hand, the data points 520 are a subset of the reduced set of data points obtained at S705 having, for each of at least some of the data sources, the data point with the timestamp that is most recent to the time of Dec. 4, 2024 17:20. Since the GPS data point with timestamp of 17:10 is the most recent in time from 17:20, this data point is extracted from the data set 500 for inclusion in the data set 520.

For some of the data types, e.g. the sensor data type, a later data point may cancel an earlier data point such that, if the time for the location estimate is later than the timestamp of the later data point, both data points may be excluded from consideration when estimating the location. As an example, the data set 510 includes a data point indicating that presence was detected at 13:07. However, the data set 500 further includes a data point having timestamp 13:58 indicating that no presence was detected. For the data set 520, in response to the later data point having timestamp 13:58 the system 305 excludes the earlier data point having timestamp 13:07 from the subset of data points obtained at S710.

At S712, the system 305 applies the attrition rules to the subset of data points obtained at S710 to modify at least some of the confidence scores based on the time elapsed between the event represented by the data point and the time for the location estimate. For each of the at least some of the data point, modifying the confidence score comprises reducing the confidence score. S712 is performed at least for data points having the attrition rules 'TimeSinceLastReport(5 Min)' and 'WorkingHoursTimeSinceLastReport(5 Min)' to reduce the confidence based on the amount of time that has expired. S712 may also be applied for data points having attrition rules other than those shown. If the confidence score is reduced for a data point, this reduced confidence score is applied in the subsequent steps of method 700.

At S715, the system 305 determines whether or not there are any conflicts between the locations identified in the data points belonging to the subset of data points obtained at S710. A conflict may be present if two or more of the data points indicate different locations at any level of the hierarchy of locations. As an example, a conflict is identified if one data point (e.g. Wi-Fi location data) provides a location indication of the eighth floor of building A, but another data point (e.g. connected laptop at workstation) provides a location indication of the fourth floor. If a conflict is determined, the method proceeds to S722. On the other hand, if no conflict is identified, the method proceeds to S720 at which the system 305 provides the location estimate as being the location indication contained in each of the obtained data points.

At S720, in addition to providing the location estimate, the system 305 also provides a confidence score associated with the location estimate. The confidence score associated with the location estimate is based upon the confidence scores associated with the individual data points. The system 305 may process the data points in turn and raise the confidence factor associated with the location estimate in response to each processed data point. As an example, the location estimate may be determined based upon a number of data points, including a first one of the data points indicating that a user has a reservation on desk 55 on floor 4 of building A (the first data point being associated with a confidence score of 10%). Based on this first one of the data points, the system 305 generates an initial location estimate with this location indication and a confidence score of 10%. A second one of the data points may indicate that the user has entered building A, and when processed by the system 305, has the effect of raising the confidence factor associated with the location estimate to 40%. A third one of the data points may correspond to a Wi-Fi report indicating that the user is present on floor 4 and has the effect of raising the confidence factor associated with the location estimate to 75%.

The system 305 may determine the confidence for the location estimate in dependence, not only on the confidence score provided in the individual data point but also upon the type of data source. The system 305 may store a pre-defined priority associated with certain data sources, and to weight these data sources more heavily when determining the confidence score associated with the location estimate. For example, one or more data sources, although providing data indicating presence of a person with a high degree of confidence, e.g. motion sensor data, provide data that is anonymous and not explicitly associated with a user. The system 305 may weight data points derived from these sources less heavily than data points that are associated with the user, e.g. user check-in data or location data from a user device of the user. In some embodiments, the system 305 may receive data reports of the same type of data (e.g. Wi-Fi reports), but indicating the locations of different user devices (e.g. devices 310, 340) and therefore being associated with different data sources. When determining the confidence score associated with a location estimate, the system 305 may weight the location indications associated with one type of device (e.g. the mobile device 310) more heavily than the location indications associated with another type of device (e.g. a laptop device 340).

When determining the confidence score associated with the location estimate, in addition to considering a single data point associated with each source, the system 305 may, for some data sources, consider how the location indicating of the most recent data point associated with that source differs from location indications belonging to earlier data points derived from earlier sources. If the data points associated with a data source show differences in location indication over time, the system 305 may weight the most recent data point more heavily in the evaluation of the location estimate. For example, if a data points associated with Wi-Fi data reports show a high degree of movement (indicating that the associated user device is in possession of the user), the most recent data point derived from a Wi-Fi data report may be weighted highly when determining the confidence score associated with the location estimate. In some cases where the indicated location is a workstation, when a number of data points associated with the same data source but indicating the same workstation are obtained by the system, the system 305 may determine with a higher degree of confidence that the user is present at the workstation.

In some embodiments, the system 305 may discard a location estimate if the confidence score associated with the location is below a threshold (e.g. below 20%) since the location estimate is not considered reliable.

If, at S715, it is determined that one or more of the relevant subset of data points conflict with one another, the method 700 proceeds to S722. At S722, the system 305 provides a plurality of location estimates, where a different location estimate is provided for each of the different location indications in the data points. Each of the plurality of location estimates is provided with an associated confidence score. Each of the plurality of location estimates is calculated in the same manner as the single location estimate determined in S720, but is determined in dependence upon the subset of data points indicating the associated location. For example, if a first data point is a room booking indicating that the user is present on in room 1 of the first floor, a second data point is a motion sensor detecting presence in room 1 of the first floor, and a third data point is a Wi-Fi location report indicating the user is present on the fourth floor, the system 305 outputs a first location estimate indicating room 1 of the first floor and a second location estimate indicating the fourth floor. The first location estimate and its associated confidence score is determined based on the first and second data points, whereas the second location estimate and its associated confidence score is determined based on the third data point. The conflicting location estimates are then resolved by the system in S724, S725 and S730 of method 700.

At S724, the system 305 compares the confidence scores of each of the location estimates to determine whether or not at least one of one or more conditions is met indicating that the confidence scores are similar and, therefore, that there is not one clear location that should be provided as the location assertion. The system 305 may determine that one of the conditions is met if the confidence scores associated with each of the location estimates is greater than a predefined amount (e.g. 90%). The system 305 may determine that one of the conditions is met if the confidence scores associated with the different location estimates each fall within a predefined range (e.g. 50% to 80%). The system 305 may determine that one of the conditions is met if the difference between confidence scores associated with the different location estimates is less than a predefined amount (e.g. 20%).

If one of the conditions is met indicating that there are a number of conflicting location estimates having similar confidence levels, at S725 the system 305 provides as the location estimate output a list of the different location estimates with their associated confidence levels. The location estimate output may be referred to as a 'location assertion'. The location assertion comprises one or more location estimates and, in the case that S725 is performed, comprises multiple location estimates.

If at S724, the system 305 determines that none of the conditions are met indicating that there is a high level of difference in the confidence scores associated with the different location estimates, the system 305 proceeds to S730 at which the system 305 provides as the location assertion, the one of the locations belonging to the data point having the highest confidence score. The other location estimate having the lower confidence score is discarded.

Since the confidence score for the location estimates is, as discussed above, determined based on one or more of the confidence scores for the data points, the pre-defined priority allocated to certain data sources, movement indicated by data points for certain data sources, these factors may be used by the system 305 (at S724 and S730) to select between a location estimate produced on the basis of a first set of data points indicating one location and a second set of data point indicating another location.

The location estimate provided at S730 is provided with a confidence score that is dependent upon the confidence scores and data sources of the data points providing the conflicting location estimates. For example, if first location estimate derived from a Wi-Fi location report indicating that the user is on the second floor is provided with a high confidence score (e.g., 95%) whilst a second location estimate derived from a room booking indicating that the user is on the fourth floor is provided with a lower confidence (e.g. 50%), the system 305 may, in addition to discarding the lower confidence report, reduce the confidence score associated with the first location estimate as a result of the conflict. The system 305 may output as a location assertion a location estimate that the user is on the second floor with a lowered confidence (e.g. 75%). In particular, when adjusting the confidence score for a particular location, more weight may be given to contradictory reports, rather than those confirming the location.

The system 305 may perform the method 700 multiple times to obtain multiple location estimates for a user at different times. The system 305 may provide location estimates periodically, at a set of predefined times within a time period (e.g. at certain times during a working day), or in response to a request made by user input to the system 305. Additionally, the system 305 may perform each of the methods 600 and 700 to obtain locations estimates for a plurality of different users. The data sources may differ for different users, e.g. different user devices may provide the location data for different users.

The location estimates obtained by the system 305 may be used by the system 305 to perform attendance tracking or roll call (for emergency situation). The system 305 may also use one of the determined location estimates to provide location based notifications to a user device associated with the user for which the location estimate is obtained. For instance, the system 305 may provide notifications to the user device 310 when the user associated with that device is determined to be within a particular sub-area, e.g. within a particular building. The notifications which may be displayed on the user device 310 may, for example, comprise notifications of events taking place within the building in which the user is present.

In some embodiments, multiple location estimates may displayed together on a timeline. The timeline may be displayed on a visual display of the system 305 or may be displayed on a visual display of another device, e.g. device 340 or device 310.

Figure 8:
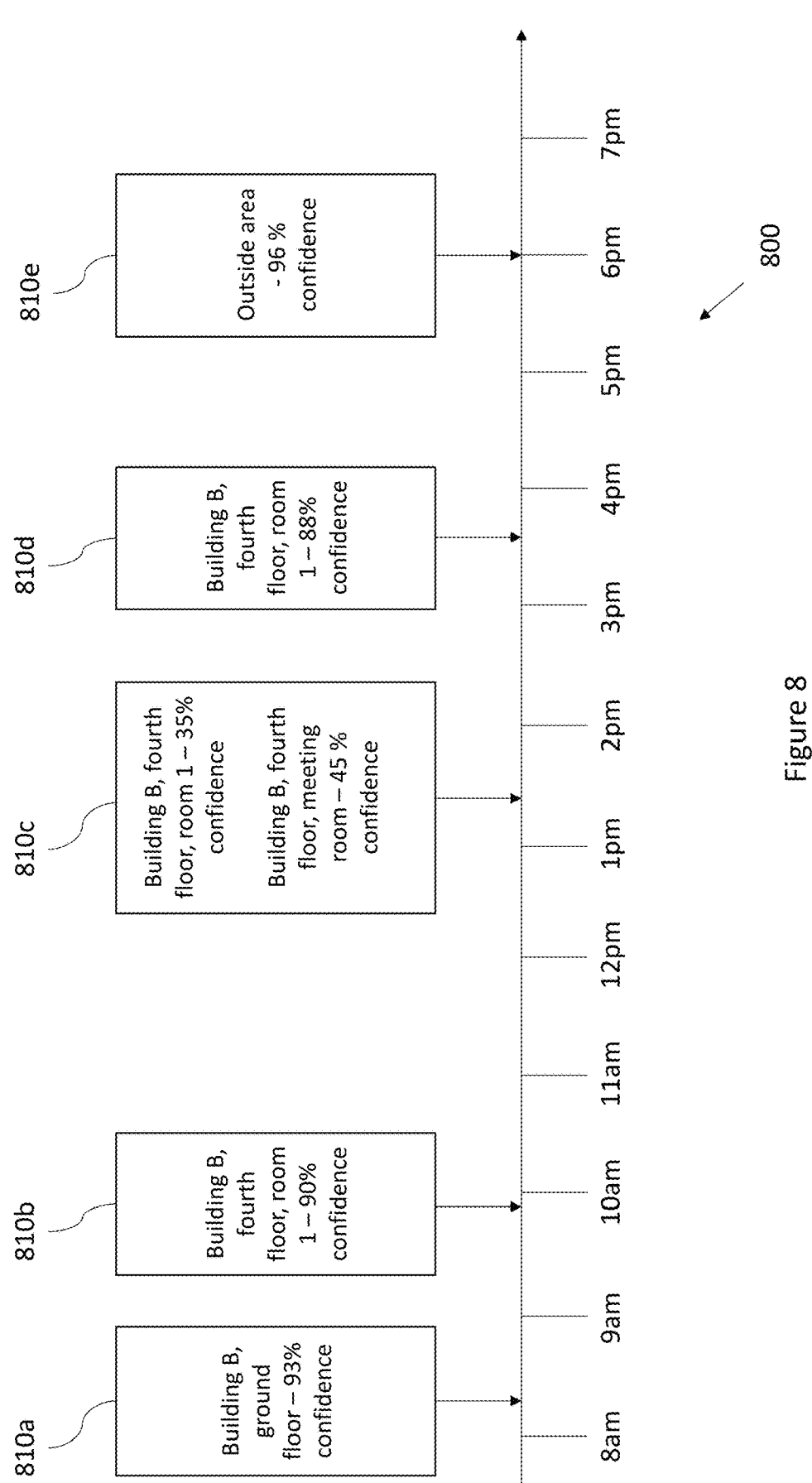
FIG. 8 illustrates a timeline of location assertions.

Reference is made to FIG. 8, which illustrates an example of such a timeline 800. The timeline 800 shows a plurality of location assertions 810*a-e* provided over a time period. The time period in this example corresponds to a working day from 8 am to 7 pm. Each of the location assertions provides at least one estimate for the user's location at a corresponding time during the relevant time period. Once a location assertion is generated, the system 305 may store the location estimate provided in this assertion as representing the location's location (e.g. for the purpose of provide location based notifications) until a further location assertion is generated having a different estimate. As shown in FIG. 8, the location assertion 810*c* provides two location estimates having different confidence levels.

Implementations of the subject matter and the operations described in this specification can be realized in digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A computer system comprising at least one processor and at least one memory comprising computer readable instructions, the at least one processor being configured to execute the instructions to perform the steps of:

obtaining location data associated with a user device and derived from a plurality of three data sources within a building, including wireless access points, wired connections and Bluetooth devices, wherein the location data comprises, for each of the data sources, one or more data points, each of which comprises a location indication, time data associated with the location indication, an indication of the data source from which the location indication was derived, and a confidence score associated with the location indication; and producing a location estimate for the user device in relation to an area in the building at a given time point by:

for each of the data sources, obtaining one of the data points from amongst the data points associated with the respective data source, the obtained data point having time data that corresponds to the given time point;

providing the location estimate based on the location indications, confidence scores and time data associated with the obtained data points; and adjusting for each of the obtained data points, the confidence score based on the respective attrition rule for each of the three types of data sources and based on an amount of elapsed time between the given time point and a time point indicated by the respective time data; and displaying a timeline of location estimates for the user device in the building, the timeline including the location estimate and the confidence score for the user device at the given time points.

2. A computer system as claimed in claim 1, wherein for each of the data sources, the one or more data points comprises a plurality of data points.

3. A computer system as claimed in claim 1, wherein the at least one processor is configured to execute the instructions to:

in response to determining that a first indication of the location of each of a first set of one or more of the obtained data points is inconsistent with a second indication of location of each of a second set of obtained data points, selecting between the first indication and the second indication based on one or more of:

whether the data points from any of the data sources for the first and second sets indicate that the user is moving within a particular period associated with the given time point;

a pre-defined priority allocated to each data source for the first and second sets; and the confidence scores for the data points in the first and second data sets; and determining the estimated location based on the selected indication of the location.

4. A computer system as claimed in claim 1, wherein for each of the data sources, each of the one or more data points comprise an attrition rule, wherein the at least one processor is configured to execute the instructions to:

for each of the at least some of the obtained data points, adjust the confidence score based on the respective attrition rule for each type of data source and on an amount of elapsed time between the given time point and a time point indicated by the respective time data; and use the adjusted confidence scores to determine a location estimate associated with the location estimate.

5. A computer system as claimed in claim 1, wherein the at least one processor is configured to execute the instructions to:

in response to determining that the indication of the location of at least one of the obtained data points is inconsistent with one or more other indications of the locations of one or more others of the obtained data points:

provide the estimate of the location for the user based upon the one or more others of the obtained data points; and provide a further estimate of the location for the user based upon the at least one of the obtained data points.

6. A computer system as claimed in claim 1, wherein obtaining the data belonging to a plurality of data sources comprises:

receiving ones of the data points derived from a first of the data sources from a first device; and receiving ones of the data points derived from a second of the data sources from a second device, which is a different type of device to the first device.

7. A computer system as claimed in claim 6, wherein the first device is a user device associated with the user.

8. A computer system as claimed in claim 1, wherein the plurality of data sources comprise one or more of:

local area network positioning data;

personal area network based positioning data;

global positioning system data;

data indicating a wired connection;

motion sensor data;

booking data;

user authentication data; and checkpoint data.

9. A computer system as claimed in claim 1, wherein obtaining the location data associated with a plurality of data sources comprises for each of the plurality of data sources:

receiving raw data associated with the respective data source from a device associated with the respective data source; and processing the raw data to produce the plurality of data points belonging to a pre-defined format comprising a pre-defined set of fields.

10. A computer system as claimed in claim 9, wherein processing the raw data comprises the determining of the confidence score.

11. A computer system as claimed in claim 1, wherein the at least one processor being configured to execute the instructions to perform the steps of:

producing a timeline of location estimates for the user in relation to the facility, the timeline including the location estimate for the user at the given time point.

12. A computer system as claimed in claim 1 wherein the estimate of the location for the user indicates at least one of: the presence of the user within the area; the absence of the user within the area; and/or a location of the user within the area.

13. A computer system as claimed in claim 1, wherein the at least one processor is configured to execute the instructions to perform the steps of:

in response to determining that the location estimate indicates a location within a predefined sub-area of the area, cause a notification to be sent to a user device associated with the user.

14. A computer implemented method comprising:

obtaining location data associated with a user device and derived from a plurality of three data sources within a building, including wireless access points, wired connections and Bluetooth devices, wherein the location data comprises, for each of the data sources, one or more data points, each of which comprises a location indication, time data associated with the location indication, an indication of the data source from which the location indication was derived, and a confidence score associated with the location indication; and producing a location estimate for the user device in relation to an area in the building at a given time point by:

for each of the data sources, obtaining one of the data points from amongst the data points associated with the respective data source, the obtained data point having time data that corresponds to the given time point; and providing the location estimate based on the location indications, confidence scores and time data associated with the obtained data points; and adjusting for each of the obtained data points, the confidence score based on the respective attrition rule for each of the three types of data sources and based on an amount of elapsed time between the given time point and a time point indicated by the respective time data; and displaying a timeline of location estimates for the user device in the building, the timeline including the location estimate and the confidence score for the user device at the given time points.

15. A non-transitory computer readable medium storing a computer program comprising a set of executable instructions, which when executed by a processor cause a method to be performed, the method comprising:

obtaining location data associated with a user device and derived from a plurality of three data sources within a building, including wireless access points, wired connections and Bluetooth devices, wherein the location data comprises, for each of the data sources, one or more data points, each of which comprises a location indication, time data associated with the location indication, an indication of the data source from which the location indication was derived, and a confidence score associated with the location indication; and producing a location estimate for the user device in relation to an area in the building at a given time point by:

for each of the data sources, obtaining one of the data points from amongst the data points associated with the respective data source, the obtained data point having time data that corresponds to the given time point; and providing the location estimate based on the location indications, confidence scores and time data associated with the obtained data points; and adjusting for each of the obtained data points, the confidence score based on the respective attrition rule for each of the three types of data sources and based on an amount of elapsed time between the given time point and a time point indicated by the respective time data; and displaying a timeline of location estimates for the user device in the building the timeline including the location estimate and the confidence score for the user device at the given time points.

* * * * *